(12) United States Patent
Bailey et al.

(10) Patent No.: US 7,126,075 B2
(45) Date of Patent: Oct. 24, 2006

(54) ELECTRO DISCHARGE MACHINING A PASSAGE USING A BACKING MEMBER

(75) Inventors: Stephen Bailey, Bristol (GB); Stephen T. Pook, Bristol (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 10/724,599

(22) Filed: Dec. 2, 2003

(65) Prior Publication Data

US 2004/0149691 A1  Aug. 5, 2004

(30) Foreign Application Priority Data

Jan. 31, 2003 (GB) ................................ 0302347.0

(51) Int. Cl.
*B23H 9/14* (2006.01)
*B23H 1/00* (2006.01)

(52) U.S. Cl. ................. 219/69.17; 205/665; 219/69.14

(58) Field of Classification Search ............ 219/69.14, 219/69.17, 69.2, 69.15; 205/665
See application file for complete search history.

(56) References Cited

U.S. PATENT DOCUMENTS

| | | | | |
|---|---|---|---|---|
| 3,314,875 A | * | 4/1967 | Andrews ............... 204/224 M |
| 3,372,099 A | * | 3/1968 | Clifford ................. 219/69.15 |
| 3,472,993 A | * | 10/1969 | Vasilievich et al. ...... 219/69.14 |
| 3,594,298 A | * | 7/1971 | Abt ....................... 204/224 M |
| 3,796,852 A | * | 3/1974 | Vlach .................... 219/69.15 |
| 3,851,135 A | * | 11/1974 | Moracz et al. ........... 219/69.17 |
| 4,134,807 A | * | 1/1979 | Briffod ................... 219/69.17 |
| 4,159,407 A | * | 6/1979 | Wilkinson et al. ......... 205/661 |
| 4,393,292 A | * | 7/1983 | Inoue .................... 219/69.17 |
| 4,752,665 A | | 6/1988 | del Santo et al. |
| 4,923,371 A | * | 5/1990 | Ben-Amoz ................ 416/97 R |
| 5,004,530 A | * | 4/1991 | Tanaka .................. 204/224 M |
| 5,290,987 A | | 3/1994 | Davis et al. |
| 5,599,466 A | * | 2/1997 | Maier et al. ............ 219/69.17 |
| 5,738,777 A | * | 4/1998 | Bliek et al. ............... 205/665 |
| 6,180,908 B1 | * | 1/2001 | Tanishiki et al. ......... 219/69.14 |

FOREIGN PATENT DOCUMENTS

GB  2 254 280 A  10/1992
JP  1-135419 A  * 5/1989

* cited by examiner

*Primary Examiner*—Geoffrey S. Evans
(74) *Attorney, Agent, or Firm*—Oliff & Berridge, PLC

(57) ABSTRACT

A method and apparatus for electro discharge machining a passage through a work piece using a hollow electro discharge machining electrode and a corresponding flushing agent supplied via the hollow electrode. A backing member is positioned abutting the exit face of the work piece so that at break through the path of the flushing agent is not disrupted. The backing member positioned such that it forms a fluid tight seal with the work piece.

6 Claims, 2 Drawing Sheets

ELECTRO DISCHARGE MACHINING A PASSAGE USING A BACKING MEMBER

This invention pertains generally to the field of electro-discharge machining. In particular it relates to an electro discharge machining method, an electro discharge machining apparatus and an electro discharge machined component.

The process of electro discharge machining (EDM) is well known in the art. Material is removed from an electrically conductive work piece by controlled sparks originating from a specially shaped electrode. As material is removed by the spark, the electrode is moved through the work piece. The resulting passage has the inverse shape of the electrode. This process produces debris which must be removed from the electrode's path. This is commonly achieved by flushing the passage with a pressurised dielectric flushing agent. The flushing agent is supplied via a channel in the EDM electrode. The quality of the surface finish and the efficiency of the cutting process are dependent upon the pressure of the fluid in the passage being maintained above a level sufficient to maintain efficient running of the process.

It is frequently required to produce a through passage in a component. When the EDM electrode breaks through the exit surface the flow path of the flushing agent is disrupted. This reduces the effectiveness of the flushing process, thereby increasing the overall machining time and reducing the quality of the passage's surface finish and dimensions. In applications where passages are employed in components to supply specific flow rates or fluid with a specific velocity profile it is of significant demerit to have a malformed passage.

According to a first aspect of the present invention there is provided a method of electro discharge machining a passage through a work piece using a hollow electro discharge machining electrode and a corresponding flushing agent supplied via the hollow electrode wherein a discrete backing member is positioned abutting the face of the work piece through which the electrode exits so that at break through of said electrode through said work piece the path of the flushing agent is not disrupted.

Preferably the backing member is positioned such that it forms a fluid tight seal with the work piece.

According to a second aspect of the present invention there is provided apparatus for electro discharge machining a passage through a work piece comprising a hollow electro discharge machining electrode, a corresponding flushing agent supplied via the hollow electrode and a discrete backing member positioned abutting the face of the work piece through which the electrode exits so that at break through of said electrode through said work piece the path of the flushing agent is not disrupted.

The invention is a method and apparatus which maintain the flushing agent flow path when the EDM electrode breaks through the exit surface of the work piece.

The EDM process is well known in the field and need not be discussed here in detail in order to gain an appreciation of the invention in question. In summary, however, the apparatus required to execute the inventive method is an EDM electrode, a suitable flushing agent and a backing member.

The backing member should be positioned such that it forms a fluid tight seal with the work piece and such that it spans the break through region on the exit surface. The backing member is formed by a material that will not damage the electrode nor substantially degrade the flushing agent.

The electrode moves towards and into the backing member until halted and withdrawn from the passage. The backing member forms a closed end of the passage, preventing the flow path of the flushing agent being disrupted, thereby enabling the efficient removal of debris from the passage.

The invention and how it may be constructed and executed will now be described in greater detail with reference by way of example to an embodiment illustrated in the accompanying drawings in which.

Figure 1:
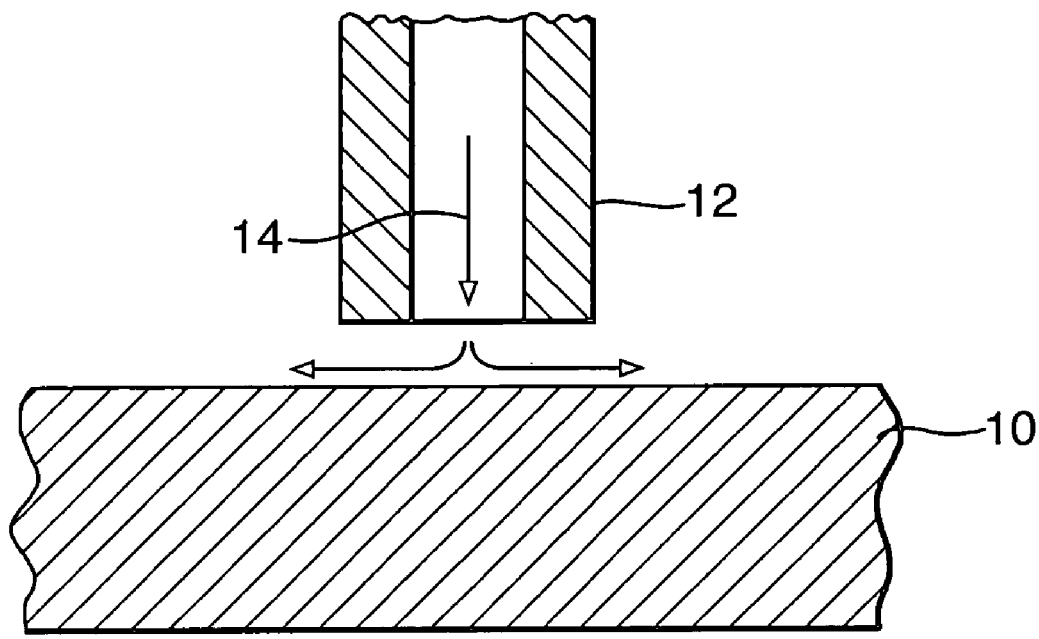
FIG. 1 (Prior Art) shows a sectional view of a hollow EDM electrode with flowing flushing agent positioned above a work piece.
Figure 2:
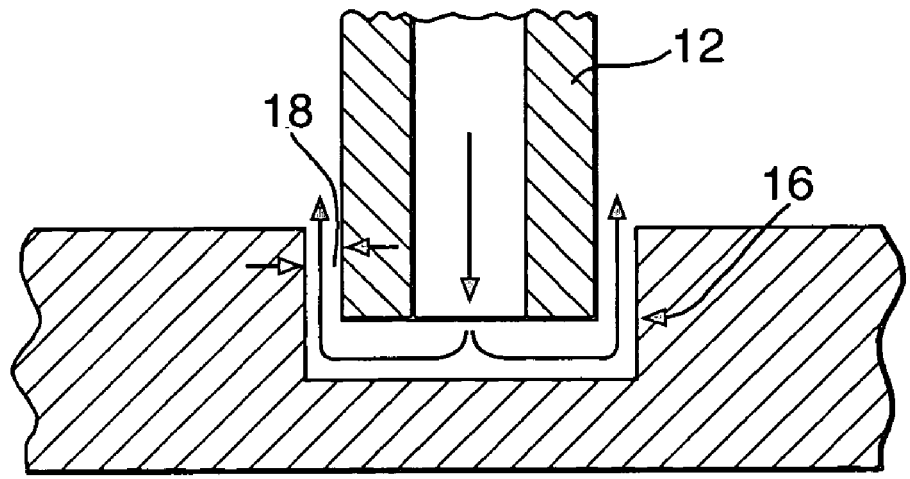
FIG. 2 (Prior Art) shows a sectional view of a hollow EDM electrode with flowing flushing agent positioned inside a partially eroded work piece.
Figure 3:
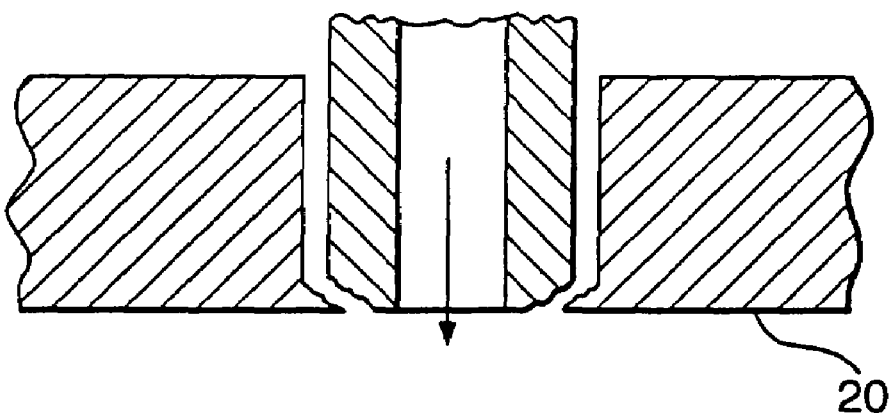
FIG. 3 (Prior Art) shows a sectional view of a hollow EDM electrode with flowing flushing agent having broken through the exit face of the work piece.

The apparatus and process for forming a passage in a work piece is as described by the prior art and as shown in FIGS. 1 to 3. A work piece 10 is positioned under a hollow EDM electrode 12, through which a dielectric flushing agent 14 is supplied under pressure. The electrode is in communication with a source of electricity via a discharge pulse controller (not shown). Controlled sparks discharged from the tip of the EDM electrode erode the work piece 10. As material is removed to form a passage 16, the electrode is translated inside of the work piece (see FIG. 2). There is a small clearance 18 between the external walls of the electrode 12 and the walls defining the passage 16. At this stage of the machining process the flushing agent 14 flows from the tip of electrode 12 and through the clearance 18 and fills a cavity defined by the clearance 18, thereby removing debris from the machining point. The resulting passage has the inverse shape of the electrode.

Break through occurs when the electrode 12 emerges from the exit face 20, as shown in FIG. 3. At break through the path of the flushing agent 14 is re-directed such that it exits from the exit face 20 rather than being directed through the clearance gap 18.

Figure 4:
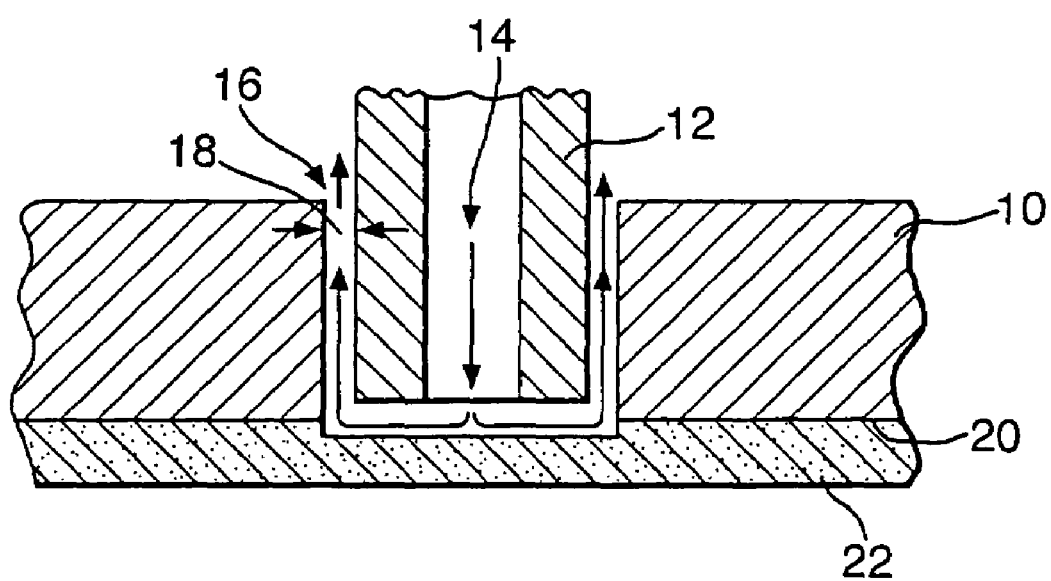
FIG. 4 shows a sectional view of a work piece being drilled by a hollow EDM electrode with a backing member positioned on the exit face.

Shown in FIG. 4, and in accordance with the present invention, is a similar arrangement to that described in the prior art except that a backing member 22 is positioned abutting the exit face 20 of the work piece 10.

The backing member 22 comprises modelling clay. Modelling clays of the Plasticine (Registered Trade Mark) type were found to have particular efficacy, but one skilled in the art would appreciate that any substance that has similarly malleable and viscid properties would be suitable.

The backing member 22 forms a fluid tight seal with the exit face 20. The fluid tight seal may be achieved by any means but may include utilising the inherent properties of the backing member 22, such as its resilience, ductility, adherence or viscosity.

With the backing member 22 in place at the point of break through the path of the flushing agent 14 is not altered and hence its effectiveness is not affected. Debris is removed from the machining point and key properties of the passage, such as its surface finish and geometry, are achieved.

Modelling clay has particular benefit as a backing member 22 since the clay is deformed only locally when the electrode 12 breaks through the workpiece 10. Hence the backing member 22 retains a fluid tight seal with the exit face 20 in regions adjacent to the breakthrough region of passage 16, thereby ensuring the path of the flushing agent 14 is not disrupted when a further passage is drilled adjacent to the passage 16.

The modelling clay is not significantly damaged, degraded or melted because of contact with the electrode 12 or flushing agent 14.

It will be appreciated that any work piece may be electro discharge machined employing the described method and apparatus, provided that the work piece material is electrically compatible with such a process.

It will also be appreciated that the described method and apparatus are particularly applicable to the production of aerospace components, where the surface finish and geometry of the passage are of paramount importance to ensure correct metering and distribution of fluids.

The configurations shown in FIGS. 1 to 4 are diagrammatic. The design and properties of the work piece, EDM electrode, flushing agent and backing member may vary. Likewise the combination, configuration and positioning of these components relative to one another will vary between designs.

The invention claimed is:

1. A method of electro discharge machining a passage through a work piece using a hollow electro discharge machining electrode and a corresponding flushing agent supplied via the hollow electrode wherein a discrete backing member is positioned abutting a face of the work piece through which the electrode exits so that at break through of said electrode through said work piece the backing member is locally deformed so that the path of the flushing agent is not disrupted, wherein the discrete backing member is positioned to span and abut the entire breakthrough region on the face of the work piece through which the electrode exits.

2. A method as claimed in claim 1 wherein the backing member is positioned such that it forms a fluid tight seal with the work piece.

3. A method as claimed in claim 1 wherein the backing member comprises modeling clay.

4. A method as claimed in claim 2 wherein the backing member comprises modeling clay.

5. Apparatus for electro discharge machining a passage through a work piece comprising a hollow electro discharge machining electrode, a corresponding flushing agent supplied via the hollow electrode and a discrete backing member positioned abutting a face of the work piece through which the electrode exits so that at break through of said electrode through said work piece the path of the flushing agent is not disrupted, wherein the discrete backing member is positioned to span and abut the entire breakthrough region on the face of the work piece through which the electrode exits, and wherein the backing member is made of a material that locally deforms upon breakthrough of the electrode.

6. Apparatus as claimed in claim 5 wherein the backing member comprises modeling clay.

* * * * *